(12) United States Patent
Hwang (10) Patent No.: US 9,085,693 B2
(45) Date of Patent: Jul. 21, 2015

(54) ELECTRODE WITH POLYAMIDE IMIDE-BASED BINDER FOR LITHIUM SECONDARY BATTERY AND LITHIUM SECONDARY BATTERY COMPRISING THE SAME

(75) Inventor: Cheol-Hee Hwang, Yongin-si (KR)

(73) Assignee: SAMSUNG SDI CO., LTD., Yongin-si, Gyeonggi-do (KR)

(*) Notice: Subject to any disclaimer, the term of this patent is extended or adjusted under 35 U.S.C. 154(b) by 554 days.

(21) Appl. No.: 13/137,011

(22) Filed: Jul. 15, 2011

(65) Prior Publication Data

US 2012/0088150 A1 Apr. 12, 2012

(30) Foreign Application Priority Data

Oct. 12, 2010 (KR) .................. 10-2010-0099503

(51) Int. Cl.
| | | |
|---|---|---|
| H01M 4/62 | (2006.01) | |
| C08L 79/08 | (2006.01) | |
| C08G 73/14 | (2006.01) | |
| H01M 4/134 | (2010.01) | |
| H01M 4/1395 | (2010.01) | |
| H01M 4/38 | (2006.01) | |
| H01M 4/04 | (2006.01) | |

(52) U.S. Cl.
CPC .............. *C08L 79/08* (2013.01); *C08G 73/14* (2013.01); *H01M 4/0471* (2013.01); *H01M 4/134* (2013.01); *H01M 4/1395* (2013.01); *H01M 4/38* (2013.01); *H01M 4/622* (2013.01); *H01M 4/043* (2013.01); *H01M 4/0404* (2013.01); *Y02E 60/122* (2013.01)

(58) Field of Classification Search
CPC ........................ H01M 4/622; H01M 4/0471
USPC .................... 429/217, 218.1, 231.95
See application file for complete search history.

(56) References Cited

U.S. PATENT DOCUMENTS

| 6,558,846 B1 * | 5/2003 | Tsushima et al. .......... 429/231.8 |
| 2007/0172733 A1 | 7/2007 | Minami et al. |
| 2008/0124631 A1 | 5/2008 | Fukui et al. |

(Continued)

FOREIGN PATENT DOCUMENTS

| JP | 11-073968 | 3/1999 |
| JP | 2001-068115 | 3/2001 |

(Continued)

OTHER PUBLICATIONS

Korean Notice of Allowance in KR 10-2010-0099503, dated Dec. 28, 2012 (Hwang).

(Continued)

*Primary Examiner* — Zachary Best
(74) *Attorney, Agent, or Firm* — Lee & Morse, P.C.

(57) ABSTRACT

An electrode for a lithium secondary battery and a lithium secondary battery including the same, the electrode including a polyamide imide (PAI)-based binder, wherein a 1,3-benzenediamine peak is not observed when a composition including components extracted from the electrode by a solvent capable of dissolving the polyamideimide (PAI)-based binder is analyzed with pyrolysis-gas chromatography (Py-GC) under conditions of a pyrolysis temperature of about 750 to about 780° C., a pyrolysis time of about 5 seconds to about 15 seconds, and increasing a gas chromatography oven temperature from about 40° C. to about 300° C. at a rate of about 10° C./min.

8 Claims, 4 Drawing Sheets

(56) References Cited

U.S. PATENT DOCUMENTS

| | | | |
|---|---|---|---|
| 2009/0119908 A1 | 5/2009 | Takeda et al. | |
| 2009/0136851 A1* | 5/2009 | Choi et al. | 429/231.95 |
| 2009/0253033 A1 | 10/2009 | Hirose et al. | |
| 2010/0203392 A1* | 8/2010 | Yamada et al. | 429/232 |

FOREIGN PATENT DOCUMENTS

| | | | |
|---|---|---|---|
| JP | 2007-246680 | | 9/2007 |
| KR | 10-2008-0034218 A | | 4/2008 |
| KR | 10 2009-0107413 A | | 10/2009 |
| KR | 10 2010-0051708 A | | 5/2010 |
| WO | WO 2009063902 A1 | * | 5/2009 |

OTHER PUBLICATIONS

Korean Office Action in KR 10-2010-0099503, dated Apr. 13, 2012 (Hwang).

* cited by examiner

ELECTRODE WITH POLYAMIDE IMIDE-BASED BINDER FOR LITHIUM SECONDARY BATTERY AND LITHIUM SECONDARY BATTERY COMPRISING THE SAME

BACKGROUND

1. Field

Embodiments relate to an electrode for a lithium secondary battery and a lithium secondary battery including the same.

2. Description of the Related Art

Batteries transform chemical energy generated from an electrochemical reduction-oxidation (redox) reaction of a chemical material in the battery into electrical energy. Batteries include primary batteries, (which are not rechargeable and should be disposed of after energy of the battery is consumed), and rechargeable batteries, (which may be recharged multiple times). Secondary batteries may be charged/discharged many times, based on reversible transformation between chemical energy and electrical energy.

Advances in high-tech electronics have resulted in electronic devices being small and light in weight, leading to an increase in portable electronic devices. As a power source for such portable electronic devices, demands for batteries with high energy density are increasing; and research is being conducted on lithium rechargeable batteries.

SUMMARY

Embodiments are directed to an electrode for a lithium secondary battery and a lithium secondary battery including the same.

The embodiments may be realized by providing an electrode for a lithium secondary battery, the electrode including a polyamide imide (PAI)-based binder, wherein a 1,3-benzenediamine peak is not observed when a composition including components extracted from the electrode by a solvent capable of dissolving the polyamideimide (PAI)-based binder is analyzed with pyrolysis-gas chromatography (Py-GC) under conditions of a pyrolysis temperature of about 750 to about 780° C., a pyrolysis time of about 5 seconds to about 15 seconds, and increasing a gas chromatography oven temperature from about 40° C. to about 300° C. at a rate of about 10° C./min.

The electrode may further include a silicon-based active material.

The electrode for a lithium secondary battery may undergo a drying process.

The drying process may be performed at a temperature of about 80° C. to about 200° C.

The drying process may be performed at a temperature of about 100° C. to about 145° C.

The drying process may be performed for about 4 hours to about 20 hours.

The drying process may be performed under a vacuum or under an inert gas.

A 1,3-benzenediamine peak may be observed when the polyamideimide (PAI)-based binder extracted from the electrode for a lithium secondary battery prior to performing the drying process is analyzed with pyrolysis-gas chromatography (Py-GC) under conditions of: a pyrolysis temperature of about 750° C. to about 780° C., a pyrolysis time of about 5 seconds to about 15 seconds, and increasing a gas chromatography oven temperature from about 40° C. to about 300° C. at a rate of about 10° C./min.

The solvent capable of dissolving the polyamideimide (PAI)-based binder may include at least one of N-methylpyrrolidone, toluene, and dimethyl sulfoxide (DMSO).

The electrode for a lithium secondary battery may be a negative electrode, the negative electrode including the polyamideimide (PAI)-based binder in an amount of about 4 wt % to about 7 wt %.

The electrode for a lithium secondary battery may be a positive electrode, the positive electrode including the polyamideimide (PAI)-based binder in an amount of about 3 wt % to about 5 wt %.

The electrode may not include 1,3-benzenediamine.

The embodiments may also be realized by providing a lithium secondary battery including an electrode; and an electrolyte, wherein the electrode includes a polyamide imide (PAI)-based binder, and a 1,3-benzenediamine peak is not observed when a composition including components extracted from the electrode by a solvent capable of dissolving the polyamideimide (PAI)-based binder is analyzed with pyrolysis-gas chromatography (Py-GC) under conditions of a pyrolysis temperature of about 750 to about 780° C., a pyrolysis time of about 5 seconds to about 15 seconds, and increasing a gas chromatography oven temperature from about 40° C. to about 300° C. at a rate of about 10° C./min.

The electrode may include a silicon-based active material.

The electrode may undergo a drying process.

The drying process may be performed at a temperature of about 80° C. to about 200° C.

The drying process may be performed at a temperature of about 100° C. to about 145° C.

The drying process is performed for about 4 hours to about 20 hours.

The drying process may be performed under a vacuum or under an inert gas.

A 1,3-benzenediamine peak may be observed when the polyamideimide (PAI)-based binder extracted from the electrode for a lithium secondary battery prior to performing the drying process is analyzed with pyrolysis-gas chromatography (Py-GC) under conditions of: a pyrolysis temperature of about 750° C. to about 780° C., a pyrolysis time of about 5 seconds to about 15 seconds, and increasing a gas chromatography oven temperature from about 40° C. to about 300° C. at a rate of about 10° C./min.

The solvent capable of dissolving the polyamideimide (PAI)-based binder may include at least one of N-methylpyrrolidone, toluene, and dimethyl sulfoxide (DMSO).

The electrode may be a negative electrode, the negative electrode including a negative active material layer and a current collector, and including the polyamideimide (PAI)-based binder in an amount of about 4 wt % to about 7 wt % based on the weight of the negative active material.

The electrode may be a a positive electrode, the positive electrode including a positive active material layer and a current collector, and including the polyamideimide (PAI)-based binder in an amount of about 3 wt % to about 5 wt % based on the weight of the positive active material.

The electrode may not include 1,3-benzenediamine.

BRIEF DESCRIPTION OF THE DRAWINGS

The embodiments will become more apparent to those of ordinary skill in the art by describing in detail exemplary embodiments with reference to the attached drawings, in which.

DETAILED DESCRIPTION

Korean Patent Application No. 10-2010-0099503, filed on Oct. 12, 2010, in the Korean Intellectual Property Office, and entitled: "Electrode Plate for Lithium Secondary Battery and Lithium Secondary Battery Comprising the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

An embodiment provides an electrode for a lithium secondary battery, the electrode including a polyamide imide (PAI)-based binder.

The polyamide imide (PAI)-based binder may be include ether groups, such as functional groups derived from diphenyl ether, 4,4'-oxybis-benzeneamine; or a functional group derived from 1,5-diisocyanatornaphthalene.

The polyamideimide (PAI)-based binder may improve battery performance due to excellent abrasion resistance characteristics and adherence.

When a composition (including components extracted from the electrode according to the present embodiment by a solvent capable of dissolving the polyamideimide (PAI)-based binder) is analyzed using pyrolysis-gas chromatography (Py-GC) (under conditions of a pyrolysis temperature of about 750° C. to about 780° C., a pyrolysis time of about 5 seconds to about 15 seconds, and increasing the gas chromatography oven temperature from about 40° C. to about 300° C. at a rate of about 10° C./min), a 1,3-benzenediamine peak may not be observed.

The electrode may be a negative electrode or a positive electrode.

When the electrode is a negative electrode, the negative electrode may include a current collector and a negative active material layer on the current collector. The negative active material layer may include a negative active material.

The negative active material may include a material that reversibly intercalates/deintercalates lithium ions, a lithium metal, a lithium metal alloy, a material capable of doping and dedoping lithium, a material capable of reacting with lithium ions to form a lithium-containing compound, or a transition metal oxide.

Examples of the lithium metal alloy may include lithium and at least one of Na, K, Rb, Cs, Fr, Be, Mg, Ca, Sr, Si, Sb, Pb, In, Zn, Ba, Ra, Ge, Al, and Sn.

Examples of the transition metal oxide, the material capable of doping and dedoping lithium, and the material capable of reacting with lithium ions to form a lithium-containing compound may include vanadium oxide, lithium vanadium oxide, Si-based active material, such as Si, $SiO_x$ ($0<x<2$), a Si—W alloy (wherein W includes at least one of an alkali metal, an alkaline-earth metal, a group 13 element, a group 14 element, a group 15 element, a group 16 element, a transition element, and a rare earth element, but is not Si), Sn, $SnO_2$, a Sn-Q alloy (wherein Q includes at least one of an alkali metal, an alkaline-earth metal, a group 13 element, a group 14 element, a group 15 element, a group 16 element, a transition element, and a rare earth element, but is not Sn), and the like. At least one of these materials may be mixed with $SiO_2$. In an implementation, the elements W and Q may each independently include at least one of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, and Po.

The material that reversibly intercalates/deintercalates lithium ions may include a carbon material. The carbon material may be any carbon-based negative active material suitable for use in a lithium ion rechargeable battery. Examples of the carbon material may include crystalline carbon, amorphous carbon, and mixtures thereof. The crystalline carbon may be non-shaped, or sheet, flake, spherical, or fiber shaped natural graphite or artificial graphite. The amorphous carbon may include a soft carbon, a hard carbon, mesophase pitch carbide, fired coke, and the like.

In an implementation, the electrode for a lithium secondary battery may include a silicon-based active material and the polyamideimide (PAI)-based binder. The electrode for a lithium secondary battery may exhibit high capacity due to the silicon-based active material. The electrode for a lithium secondary battery may suppress expansion of active materials due to the polyamideimide binder during alloying or de-alloying of lithium and the silican-based active material, resulting in an improvement of battery performance.

When the electrode for a lithium secondary battery is a negative electrode, the polyamideimide (PAI)-based binder may be included in an amount of about 4 to about 7 wt %, based on a total weight of the negative active material layer of the electrode. The binder may improve binding properties of the negative active material particles to each other and to a current collector. For example, the polyamideimide (PAI)-based binder may improve abrasion characteristics and adherence of the electrode, thereby resulting in an improvement of battery performance.

In an implementation, the negative active material layer may further include a conductive material. The conductive material may be included to improve electrode conductivity. Any suitable electrically conductive material may be used as a conductive material unless it causes a chemical change. Examples of the conductive material may include carbon-based materials such as natural graphite, artificial graphite, carbon black, acetylene black, ketjen black, carbon fibers, and the like; metal-based materials of metal powder or metal fiber including copper, nickel, aluminum, silver; conductive materials such as polyphenylene derivatives; or a mixture thereof.

The current collector may include a copper foil, a nickel foil, a stainless steel foil, a titanium foil, a nickel foam, a copper foam, a polymer substrate coated with a conductive metal, and combinations thereof, but is not limited thereto.

When the electrode is a positive electrode, the electrode may include a current collector and a positive active material layer on the current collector.

The positive active material layer may include a positive active material. The positive active material may include lithiated intercalation compounds that reversibly intercalate and deintercalate lithium ions. The positive active material may include a composite oxide including at least one of cobalt, manganese, and nickel, as well as lithium. In an implementation, the following lithium-containing compounds may be used, but the embodiments are not limited thereto:

$Li_aA_{1-b}X_bD_2$ (0.90≤a≤1.8, 0≤b≤0.5), $Li_aE_{1-b}X_bO_{2-c}D_c$ (0.90≤a≤1.8, 0≤b≤0.5, 0≤c≤0.05), $LiE_{2-b}X_bD_4$ (0≤b≤0.5), $LiE_{2-b}X_bO_{4-c}D_c$ (0≤b≤0.5, 0≤c≤0.05), $Li_aNi_{1-b-c}Co_bX_cD_\alpha$ (0.90≤a≤1.8, 0≤b≤0.5, 0≤c≤0.05, 0≤α≤2), $Li_aNi_{1-b-c}Co_bX_cO_{2-\alpha}T_\alpha$ (0.90≤a≤1.8, 0≤b≤0.5, 0≤c≤0.05, 0≤α≤2), $Li_aNi_{1-b-c}Co_bX_cO_{2-\alpha}T_2$ (0.90≤a≤1.8, 0≤b≤0.5, 0≤c≤0.05, 0≤α≤2), $Li_aNi_{1-b-c}Mn_bX_cD_\alpha$ (0.90≤a≤1.8, 0≤b≤0.5, 0≤c≤0.05, 0≤α≤2), $Li_aNi_{1-b-c}Mn_bX_cO_{2-\alpha}T_\alpha$ (0.90≤a≤1.8, 0≤b≤0.5, 0≤c≤0.05, 0≤α≤2), $Li_aNi_{1-b-c}Mn_bX_cO_{2-\alpha}T_2$ (0.90≤a≤1.8, 0≤b≤0.5, 0≤c≤0.05, 0≤α≤2), $Li_aNi_bE_cG_dO_2$ (0.90≤a≤1.8, 0≤b≤c≤0.9, 0≤c≤0.5, 0.001≤d≤0.1), $Li_aNi_bCo_cMn_dG_eO_2$ (0.90≤a≤1.8, 0≤b≤0.9, 0≤c≤0.5, 0≤d≤0.001≤b≤0.1), $Li_aMn_2G_bO_2$ (0.90≤a≤1.8, 0.001≤b≤0.1), $Li_aCoG_bO_2$ (0.90≤a≤1.8, 0.001≤b≤0.1), $Li_aMnG_bO_2$ (0.90≤a≤1.8, 0.001≤b≤0.1), $Li_aMn_2G_bO_4$ (0.90≤a≤1.8, 0.001≤b≤0.1), $QO_2$, $QS_2$, $LiQS_2$, $V_2O_5$, $LiV_2O_5$, $LiIO_2$, $LiNiVO_4$, $Li_{(3-f)}J_2(PO_4)_3$ (0≤f≤2), $Li_{(3-f)}Fe_2(PO_4)_3$ (0≤f≤2), and $LiFePO_4$.

In the above chemical formulae, A may include, e.g., Ni, Co, Mn, or a combination thereof, X may include, e.g., Al, Ni, Co, Mn, Cr, Fe, Mg, Sr, V, a rare earth element, or a combination thereof, D may include, e.g., O, F, S, P, or a combination thereof, E may include, e.g., Co, Mn, or a combination thereof, T may include, e.g., F, S, P, or a combination thereof, G may include, e.g., Al, Cr, Mn, Fe, Mg, La, Ce, Sr, V, or a combination thereof, Q may include, e.g., Ti, Mo, Mn, or combination thereof, I may include, e.g., Cr, V, Fe, Sc, Y, or a combination thereof, and J may include, e.g., V, Cr, Mn, Co, Ni, Cu, or a combination thereof.

The positive active material may include the positive active material with a coating layer, or a compound of the active material and the active material coated with the coating layer.

The coating layer may include a coating element compound including at least one of an oxide and a hydroxide of the coating element, an oxyhydroxide of the coating element, an oxycarbonate of the coating element, and a hydroxycarbonate of the coating element. The compound for the coating layer may be amorphous or crystalline. The coating element included in the coating layer may include, e.g., Mg, Al, Co, K, Na, Ca, Si, Ti, V, Sn, Ge, Ga, B, As, Zr, or a mixture thereof. The coating process may include any suitable processes as long as it does not cause any side effects on the properties of the positive active material (e.g., spray coating, immersing).

When the electrode for a lithium secondary battery is a positive electrode, the polyamideimide (PAI)-based binder may be included in an amount of about 3 wt % to about 5 wt % based on the weight of the positive active material layer.

The polyamideimide (PAI)-based binder may improve binding properties of particles of the positive active material to each other and to a current collector. For example, the polyamideimide (PAI)-based binder may improve abrasion characteristics and adherence of the electrode resulting in improvement of battery performance.

The positive active material layer may further include a conductive material. The conductive material may improve electrical conductivity of the positive electrode. An electrically conductive material that does not cause a chemical change may be suitable as the conductive material or agent. Examples of the conductive material may include carbon-based materials such as natural graphite, artificial graphite, carbon black, acetylene black, ketjen black, carbon fibers, and the like; metal-based materials of metal powder or metal fiber including copper, nickel, aluminum, silver; conductive polymer materials such as polyphenylene derivatives; or a mixture thereof.

The current collector may include, e.g., aluminum, but is not limited thereto.

The electrode including the polyamideimide (PAI)-based binder may be fabricated as follows.

The active material, the conductive material, and the polyamideimide (PAI)-based binder may be mixed in a solvent to provide an active material composition. The composition may be coated on a current collector and then dried and pressed.

The drying process may be performed under vacuum conditions or under an inert gas. The inert gas may include, e.g., nitrogen, argon, or the like.

The drying process may be performed at a temperature of about 80° C. to about 200° C., e.g., about 100° C. to about 145° C. When the drying is within this range, an electrode swelling phenomenon may be suppressed.

The drying process may be performed for about 2 hours to about 20 hours, e.g., for about 4 hours, for about 8 hours, or for about 12 hours.

In order to perform pyrolysis-gas chromatography (Py-GC) analysis, a completed electrode for a lithium secondary battery including a polyamideimide (PAI)-based binder may be dipped in a solvent capable of dissolving the polyamideimide (PAI)-based binder to extract some components from the electrode. Then, the solvent may be removed to provide a composition including the polyamideimide (PAI)-based binder and other components extracted from the electrode. When the composition is analyzed for a pyrolysis-gas chromatography (Py-GC), a 1,3-benzenediamine peak may not be observed.

The pyrolysis-gas chromatography (Py-GC) may be analyzed under conditions of a pyrolysis temperature of about 750° C. to about 780° C., a pyrolysis time of about 5 seconds to about 15 seconds, increasing the gas chromatography oven temperature from about 40° C. to about 300° C. at a rate of about 10° C./min.

The solvent for dissolving the polyamideimide (PAI)-based binder may include, e.g., N-methylpyrrolidone, toluene, dimethyl sulfoxide (DMSO) or the like.

On the other hand, prior to performing the drying process, the electrode may be dipped in a solvent capable of dissolving the polyamideimide (PAI)-based binder to extract some components as described above. Then, the solvent may be removed to provide a composition including the polyamideimide (PAI)-based binder and other components extracted from electrode. When the composition is analyzed using pyrolysis-gas chromatography (Py-GC), a 1,3-benzenediamine peak may be observed. The pyrolysis-gas chromatography (Py-GC) may be analyzed under the same condition as described above.

From this, it is estimated that the inside composition is changed before and after the dry process in the electrode for a lithium secondary battery. In other words, the electrode substantially does not include 1,3-benzenediamine after the drying process since the 1,3-benzenediamine is decomposed through the dry process.

The lithium secondary battery including the electrode in which 1,3-benzenediamine has been substantially removed after the drying process may exhibit excellent cycle-life characteristic.

Another embodiment provides a lithium secondary battery including the electrode for a lithium secondary battery and an electrolyte. The lithium secondary battery may exhibit the improved cycle-life characteristics as well as excellent swelling suppression characteristics of the electrode.

Figure 1:
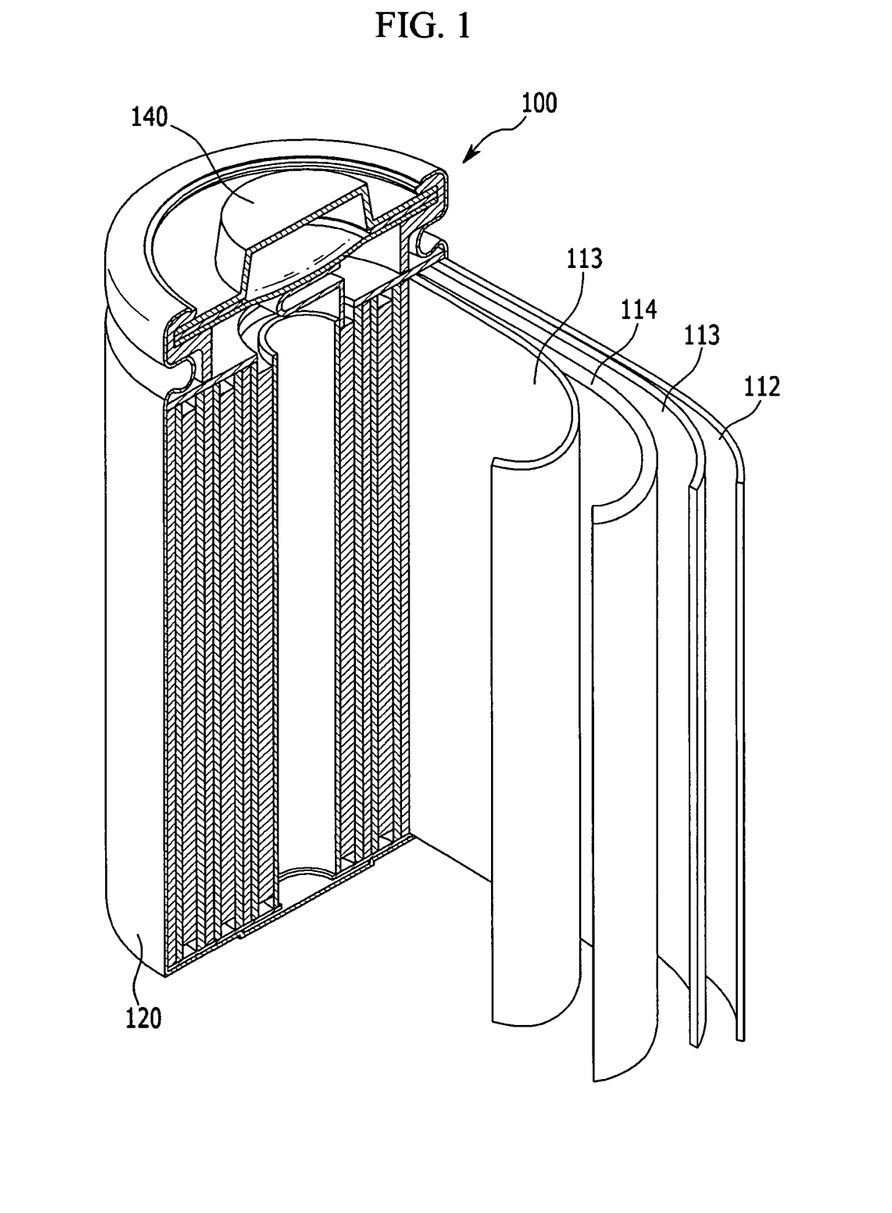
FIG. 1 illustrates a schematic view of a lithium secondary battery in accordance with an embodiment.

FIG. 1 illustrates a schematic view of a lithium secondary battery in accordance with an embodiment.

As shown in FIG. 1, the lithium secondary battery 100 may have a cylindrical shape and may include a positive electrode 114, a negative electrode 112, a separator 113 between the positive electrode 114 and negative electrode 112, an electrolyte solution (not shown) impregnated in the positive electrode 114, the negative electrode 112, and the separator 113, a battery case 120, and a sealing member 140 sealing the battery case 120. The lithium secondary battery 100 may be fabricated by sequentially stacking the negative electrode 112, positive electrode 114, and separator 113, spiral-winding them, and housing the wound product in the battery case 120.

The positive electrode 114 may include a current collector and a positive active material layer disposed on the current collector.

In a non-aqueous electrolyte secondary battery, the electrolyte may include a non-aqueous organic solvent and a lithium salt. The non-aqueous organic solvent may serve as a medium for transmitting ions taking part in electrochemical reactions of the battery.

The non-aqueous organic solvent may include, e.g., a carbonate-based, ester-based, ether-based, ketone-based, alcohol-based, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), or the like. Examples of the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, or the like. Examples of the ether-based solvent may include dibutyl ether, tetraglyme, diglyme, dimethoxyethane, 2-methyltetrahydrofuran, tetrahydrofuran, or the like, and examples of the ketone-based solvent include cyclohexanone, or the like. Examples of the alcohol-based solvent may include ethyl alcohol, isopropyl alcohol, and the like. Examples of the aprotic solvent may include nitriles such as R—CN (where R is a C2 to C20 linear, branched, or cyclic hydrocarbon, a double bond, an aromatic ring, or an ether bond), amides such as dimethylformamide, dioxolanes such as 1,3-dioxolane, sulfolanes, or the like.

The non-aqueous organic solvent may be used singularly or in a mixture thereof. When the organic solvent is used in a mixture, a mixture ratio may be controlled in accordance with a desirable battery performance.

The carbonate-based solvent may be prepared by mixing a cyclic carbonate and a linear carbonate. The cyclic carbonate and the chain carbonate may be mixed together in a volume ratio of about 1:1 to about 1:9. Maintaining the volume ratio within this range may help ensure that performance of the electrolyte is improved.

In addition, the non-aqueous organic electrolyte may be further prepared by mixing a carbonate-based solvent with an aromatic hydrocarbon-based solvent. The carbonate-based and the aromatic hydrocarbon-based solvents may be mixed together in a volume ratio of about 1:1 to about 30:1.

The aromatic hydrocarbon-based organic solvent may be represented by the following Chemical Formula 1.

[Chemical Formula 1]

In Chemical Formula 1, $R_1$ to $R_6$ may each independently include, e.g., hydrogen, halogen, a $C_1$ to $C_{10}$ alkyl group, a $C_1$ to $C_{10}$ haloalkyl group, or a combination thereof.

The aromatic hydrocarbon-based organic solvent may include, but is not limited to, at least one of benzene, fluorobenzene, 1,2-difluoro benzene, 1,3-difluoro benzene, 1,4-difluoro benzene, 1,2,3-trifluoro benzene, 1,2,4-trifluoro benzene, chloro benzene, 1,2-dichloro benzene, 1,3-dichloro benzene, 1,4-dichloro benzene, 1,2,3-trichloro benzene, 1,2,4-trichloro benzene, iodo benzene, 1,2-diiodo benzene, 1,3-diiodo benzene, 1,4-diiodo benzene, 1,2,3-triiodo benzene, 1,2,4-triiodo benzene, toluene, fluoro toluene, 1,2-difluoro toluene, 1,3-difluoro toluene, 1,4-difluoro toluene, 1,2,3-trifluoro toluene, 1,2,4-trifluoro toluene, chloro toluene, 1,2-dichloro toluene, 1,3-dichloro toluene, 1,4-dichloro toluene, 1,2,3-trichloro toluene, 1,2,4-trichloro toluene, iodo toluene, 1,2-diiodo toluene, 1,3-diiodo toluene, 1,4-diiodo toluene, 1,2,3-triiodo toluene, 1,2,4-triiodo toluene, xylene, and a combination thereof.

The non-aqueous electrolyte may further include an additive to improve cycle life. The additive may include, e.g., vinylene carbonate, an ethylene carbonate-based compound represented by the following Chemical Formula 2, or a combination thereof.

[Chemical Formula 2]

In Chemical Formula 2, $R_7$ and $R_8$ may each independently be hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group, and both $R_7$ and $R_8$ are not hydrogen.

Examples of the ethylene carbonate-based compound may include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. An amount of the additive used to improve cycle life may be adjusted within an appropriate range.

The lithium salt may be dissolved in an organic solvent, may supply lithium ions in a battery, may operate a basic operation of the rechargeable lithium battery, and may improve lithium ion transportation between positive and negative electrodes therein. Non-limiting examples of the lithium salt may a supporting salt including $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, and $LiB(C_2O_4)_2$ (lithium bis(oxalate) borate, LiBOB). The lithium salt may be used in a concentration of about 0.1M to about 2.0 M. When the lithium salt is included at the above concentration range, the electrolyte may exhibit excellent performance and lithium ion mobility due to optimal electrolyte conductivity and viscosity.

As described above, the lithium secondary battery may include the separator between the negative electrode and the positive electrode, as desired. Non-limiting examples of suitable separator materials may include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Lithium secondary batteries may include, e.g., lithium ion batteries, lithium ion polymer batteries, and lithium polymer batteries, according to presence of a separator and a kind of electrolyte used in the battery. The rechargeable lithium batteries may have a variety of shapes and sizes, and may include cylindrical, prismatic, or coin-type batteries, and may be thin film batteries or may be rather bulky in size.

The following Examples illustrate the embodiments in more detail. These Examples, however, should not in any sense be interpreted as limiting the scope of the present invention.

EXAMPLE 1

Fabricating Electrode Plate

A Si-active material and a binder of polyamide imide were mixed in a weight ratio of about 94:6 in N-methylpyrrolidone (NMP) to provide a negative active material slurry. The negative active material slurry was coated on a copper foil current collector and vacuum-dried at 145° C. for 12 hours and pressed to provide a negative electrode.

Pyrolysis-GC Analysis

Figure 2:
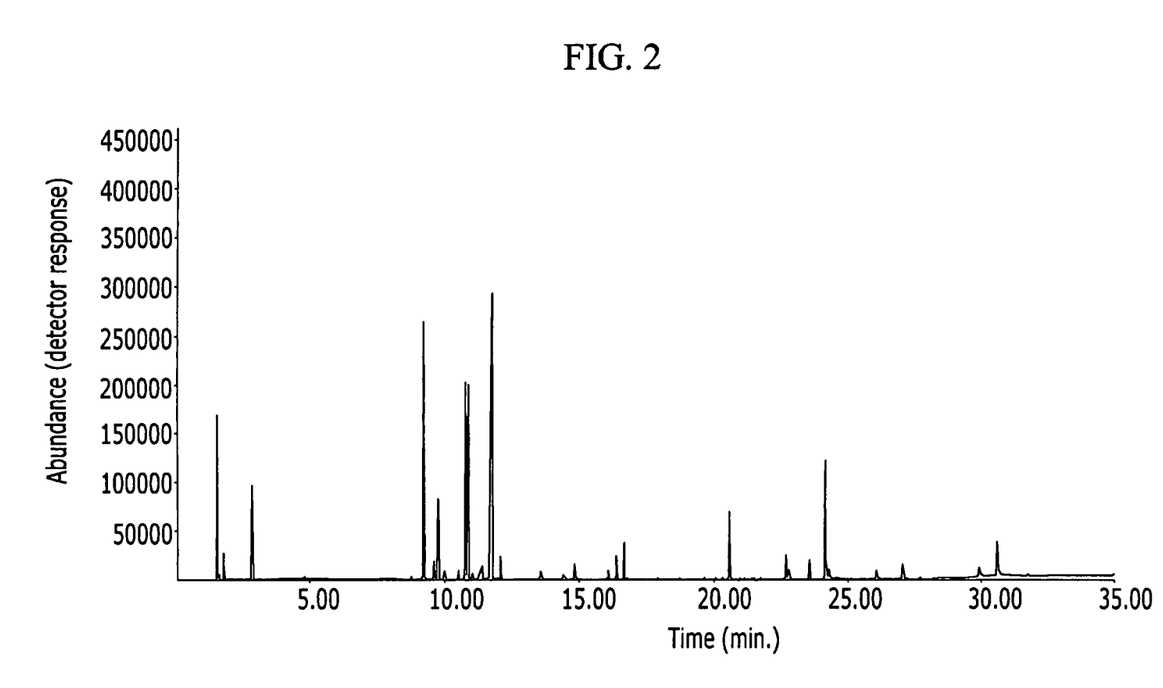
FIG. 2 illustrates a spectrum showing pyrolysis-gas chromatography (Py-GC) analysis results of components extracted from an electrode prepared according to Example 1.

The negative electrode obtained from Example 1 was dipped in a NMP solvent, filtered, and evaporated to perform pyrolysis-gas chromatography (Py-GC) analysis. FIG. 2 illustrates a spectrum showing the analysis results.

<Pyrolysis-Gas Chromatography (Py-Gc) Analysis Conditions>

Pyrolysis temperature (pyrofoil): 764° C.
Pyrolysis time: 10 seconds
Gas chromatography oven temperature: maintained at 40° C. for 5 minutes and then the temperature was increased at a rate of 10° C./minute to 300° C., followed by maintaining for 2 minutes
Pyrolzer oven: 200° C.
Pyrolzer type: curie point type
Inlet needle temperature: 280° C.
Inlet temperature: 280° C.
Split ratio: 1/50
MS detector: Quadrupole 230° C.
Solvent was not used (used for only solid sample analysis)

Figure 3:
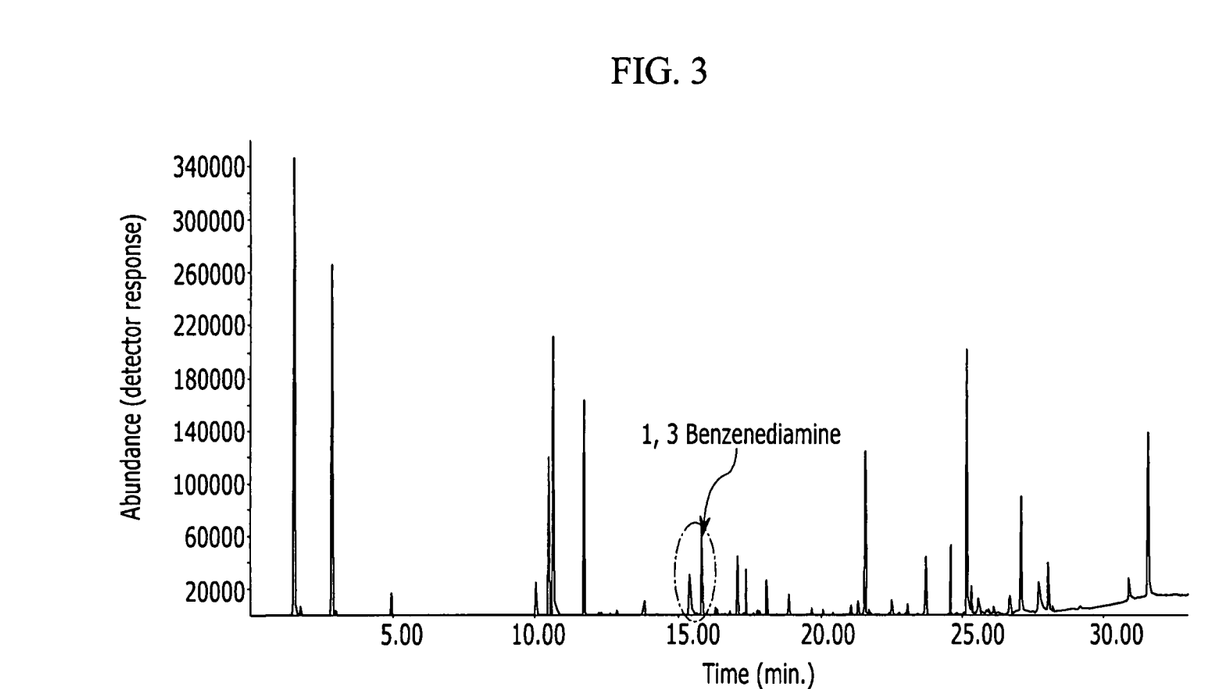
FIG. 3 illustrates a spectrum showing pyrolysis-gas chromatography (Py-GC) analysis results of components extracted from an electrode right before a drying process during the manufacturing process of Example 1.

For comparison, prior to performing the drying process, the negative electrode of Example 1 was also analyzed for a pyrolysis-gas chromatography (Py-GC) under the same condition as above. FIG. 3 illustrates a spectrum showing the analysis results.

It may be seen that a weak but broad 1,3-benzenediamine peak was observed after passing the retention time by about 15 minutes in FIG. 3; and no peak was observed in FIG. 2.

EXAMPLE 2

Fabrication of Lithium Secondary Battery Cell

A positive active material of $LiCoO_2$, a binder of polyvinylidene fluoride, and a conductive material of carbon black (super-P) were mixed in a weight ratio of 96:2:2 in N-methylpyrrolidone to provide a positive active material slurry. Then, the positive active material slurry was coated on an aluminum foil current collector, dried, and pressed to provide a positive electrode.

$LiPF_6$ was dissolved into a mixed solvent (70 volume % of a linear carbonate-based solvent of dimethyl carbonate and 30 volume % of a cyclic carbonate-based solvent of ethylene carbonate (EC)) to a concentration of 1.0 M to provide an electrolyte.

The negative electrode obtained from Example 1 and the positive electrode were wound and pressed using a polyethylene separator and inserted in a cell (2032 cell; coin full cell) case. Then, the electrolyte was injected therein to provide a lithium secondary battery cell.

Cycle-Life Characteristics

The lithium secondary battery obtained from Example 1 was charged and discharged at 25° C. in 1 C for 300 times to measure cycle-life characteristic. The results are shown in FIG. 4.

Figure 4:
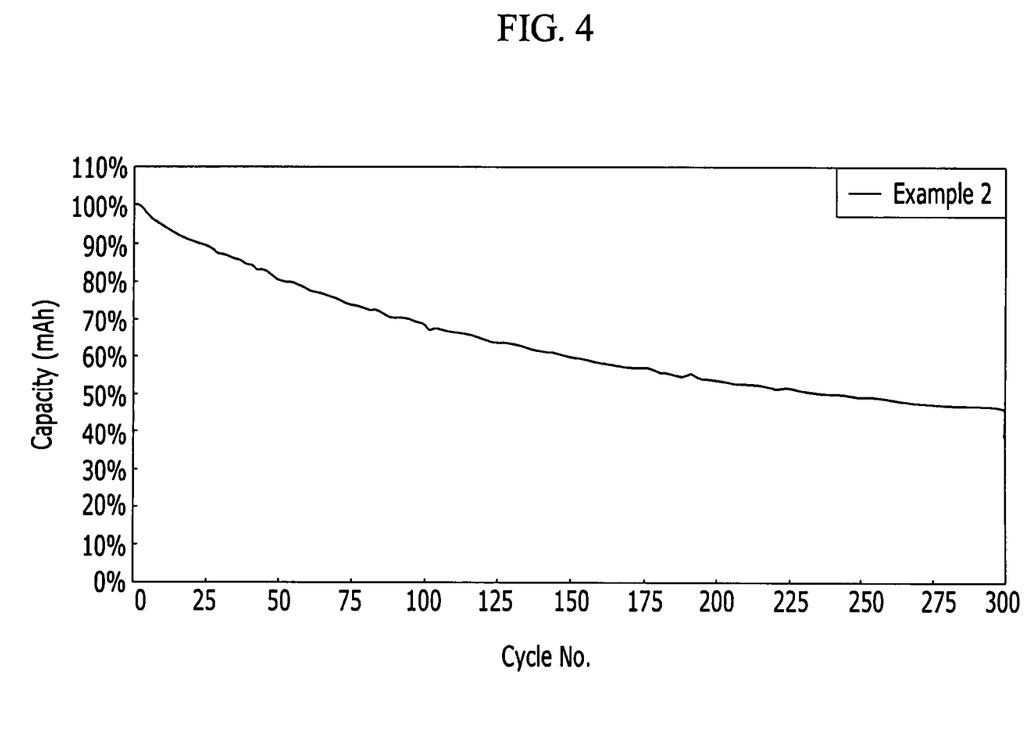
FIG. 4 illustrates a graph showing cycle-life characteristics of a lithium secondary battery prepared according to Example 2.

As shown in FIG. 4, the electrode obtained from Example 1, in which 1,3-benzenediamine was not detected, exhibited excellent cycle-life characteristic.

By way of summation and review, an electrode or electrode plate for a lithium secondary battery may be fabricated by mixing an active material, a binder, and a conductive agent to provide a slurry; coating the slurry on a current collector; and drying and pressing the same. Typically, the binder may include polyvinylidene fluoride or styrene-butadiene rubber.

Thus, the embodiments provide an electrode for a lithium secondary battery that provides a lithium secondary battery that exhibits improved cycle-life characteristics as well as excellent swelling suppression characteristics of the electrode.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A lithium secondary battery, the lithium secondary battery comprising:
    an electrode including a polyamide imide (PAI)-based binder, wherein:
        the electrode includes a positive electrode, the positive electrode including a positive active material layer and a current collector, the electrode includes the polyamideimide (PAI)-based binder in an amount of about 3 wt % to about 5 wt % based on the weight of the positive active material layer, and wherein forming the electrode consists essentially of
mixing an active material, a conductive material, and the PAI-based binder with a solvent to form an active material composition;
disposing the active material composition on a current collector to form a coating;
performing a drying process at a temperature of from 80° C. to 145° C. for about 2 to 20 hours to form a dried coating; and
pressing the dried coating to provide an electrode, and
a 1,3-benzenediamine peak is not observed when a composition including components extracted from the electrode by a solvent capable of dissolving the polyamideimide (PAI)-based binder is analyzed with pyrolysis-gas chromatography (Py-GC) under conditions of a pyrolysis temperature of about 750 to about 780° C., a pyrolysis time of about 5 seconds to about 15 seconds, and increasing a gas chromatography oven temperature from about 40° C. to about 300° C. at a rate of about 10° C./min.

2. The lithium secondary battery as claimed in claim 1, wherein the active material is a silicon-based active material.

3. The lithium secondary battery as claimed in claim 1, wherein the drying process is performed at a temperature of about 100° C. to about 145° C.

4. The lithium secondary battery as claimed in claim 1, wherein the drying process is performed for about 4 hours to about 20 hours.

5. The lithium secondary battery as claimed in claim 1, wherein the drying process is performed under a vacuum or under an inert gas.

6. The lithium secondary battery as claimed in claim 1, wherein a 1,3-benzenediamine peak is observed when the polyamideimide (PAI)-based binder extracted from the electrode for a lithium secondary battery prior to performing the drying process is analyzed with pyrolysis-gas chromatography (Py-GC) under conditions of: a pyrolysis temperature of about 750° C. to about 780° C., a pyrolysis time of about 5 seconds to about 15 seconds, and increasing a gas chromatography oven temperature from about 40° C. to about 300° C. at a rate of about 10° C./min.

7. The lithium secondary battery as claimed in claim 1, wherein the solvent capable of dissolving the polyamideimide (PAI)-based binder includes at least one of N-methylpyrrolidone, toluene, and dimethyl sulfoxide (DMSO).

8. The lithium secondary battery as claimed in claim 1, wherein the electrode does not include 1,3-benzenediamine.

* * * * *